United States Patent
McCarthy

(10) Patent No.: US 7,289,300 B2
(45) Date of Patent: Oct. 30, 2007

(54) PIEZOELECTRIC MOTOR FOR MOVING A CARRIAGE ALONG A GUIDE

(75) Inventor: Robert McCarthy, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 514 days.

(21) Appl. No.: 10/764,842

(22) Filed: Jan. 26, 2004

(65) Prior Publication Data

US 2005/0162781 A1    Jul. 28, 2005

(51) Int. Cl.
*G11B 5/55* (2006.01)
(52) U.S. Cl. ................................. 360/261.1
(58) Field of Classification Search ............ None
See application file for complete search history.

(56) References Cited

U.S. PATENT DOCUMENTS

| | | | | |
|---|---|---|---|---|
| 3,526,726 A | * | 9/1970 | Corbett et al. | 360/76 |
| 4,258,398 A | * | 3/1981 | Bixby et al. | 360/76 |
| 4,987,334 A | * | 1/1991 | Jungwirth | 310/333 |
| 5,050,157 A | * | 9/1991 | Miura et al. | 720/663 |
| 5,191,492 A | * | 3/1993 | Nayak et al. | 360/78.02 |
| 5,280,402 A | * | 1/1994 | Anderson et al. | 360/261.3 |
| 5,438,469 A | * | 8/1995 | Rudi | 360/291 |
| 5,450,257 A | * | 9/1995 | Tran et al. | 360/76 |
| 5,500,777 A | * | 3/1996 | Hasegawa et al. | 360/77.16 |
| 5,877,579 A | | 3/1999 | Zumeris | 310/323.01 |
| 6,078,440 A | * | 6/2000 | Ueyama | 359/824 |
| 6,541,931 B2 | | 4/2003 | Ho et al. | 318/560 |
| 6,563,767 B1 | | 5/2003 | Okada | 369/13.17 |

\* cited by examiner

Primary Examiner—David Davis

(57) ABSTRACT

In one embodiment, an actuator comprises a stationary guide, a carriage movable along the guide, and a piezoelectric motor operatively coupled to the carriage and pushing on the guide such that the motor when energized moves with the carriage along the guide.

9 Claims, 11 Drawing Sheets

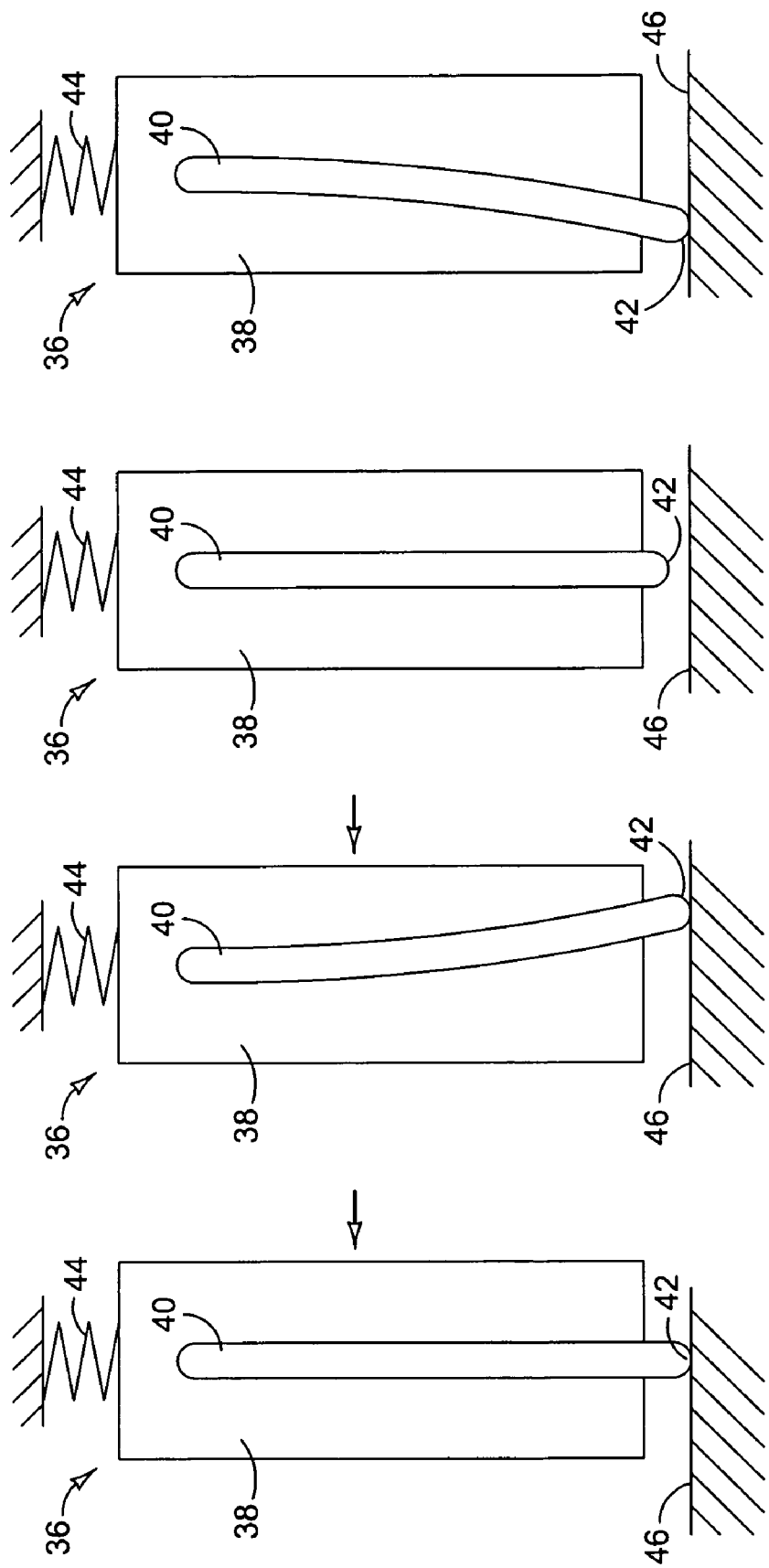

10

PIEZOELECTRIC MOTOR FOR MOVING A CARRIAGE ALONG A GUIDE

BACKGROUND

Tape drives store a vast amount of digital information on rolls of magnetic tape and are often used to backup information stored in computer systems. An example of a tape drive is a linear tape open (LTO) drive.

In a typical LTO drive, magnetic tape is stored on a supply reel contained in a removable cartridge. Data on the tape, including servo information, is arranged in 128 or more parallel tracks. During operation, the tape is passed along a series of rollers, defining the tape path, to a non-removable take up reel in the drive. The tape passes in close proximity to an assembly of read heads and write heads. The heads must be accurately positioned over the desired tracks so data can be read or written without loss and without corrupting adjacent tracks. An actuator positions the head assembly by moving it across the width of the tape. As the magnetic tape passes by the heads, the tape may have a small side-to-side motion due to the tolerances of the tape and the rollers. During coarse positioning, the actuator moves the head assembly so that a read head is close enough to a desired track to read servo information. Subsequently, during fine positioning, the servo information is read from the track and sent to servo control circuitry, which then sends a signal to the actuator to move the head directly over the desired track and to follow the small side-to-side motion of the track as it passes by the head.

Conventional actuators in LTO drives are often constructed as an electromagnetic actuator in which the head assembly is moved by the electromagnetic force from a strong permanent magnet and an electrically conductive coil. The electromagnetic actuator requires a coarse position sensor to determine the location of the head array during course positioning. Once the head assembly is over the desired track, a continuous electric current through the coil, called either a holding signal or holding current, is required to hold the head assembly in place.

DRAWINGS

FIG. 1 is a plan view of a tape drive incorporating an actuator constructed according to one embodiment of the present invention.

FIGS. 2 and 3 illustrate a head assembly positioned over a track on magnetic tape. In FIG. 2, the head assembly is positioned for a write operation. In FIG. 3, the head assembly is positioned for a read operation.

FIGS. 4-7 illustrate the operation of an exemplary piezoelectric motor.

DESCRIPTION

Embodiments of the present invention were developed in an effort to eliminate the coarse position sensor in a drive actuator, reduce stray magnetic fields near the surface of the tape by eliminating the permanent magnet used in conventional actuators, and reduce power consumption by eliminating the need for a holding current, all while retaining the precise positioning required for reliable operation. Embodiments of the invention will be described with reference to a head assembly actuator in a LTO drive such as the one shown in FIG. 1. The invention, however, is not limited to use in LTO drives. Embodiments of the invention may be implemented in other tape drives or other devices in which it may be necessary or desirable to utilize a piezoelectric actuator.

Figure 1:
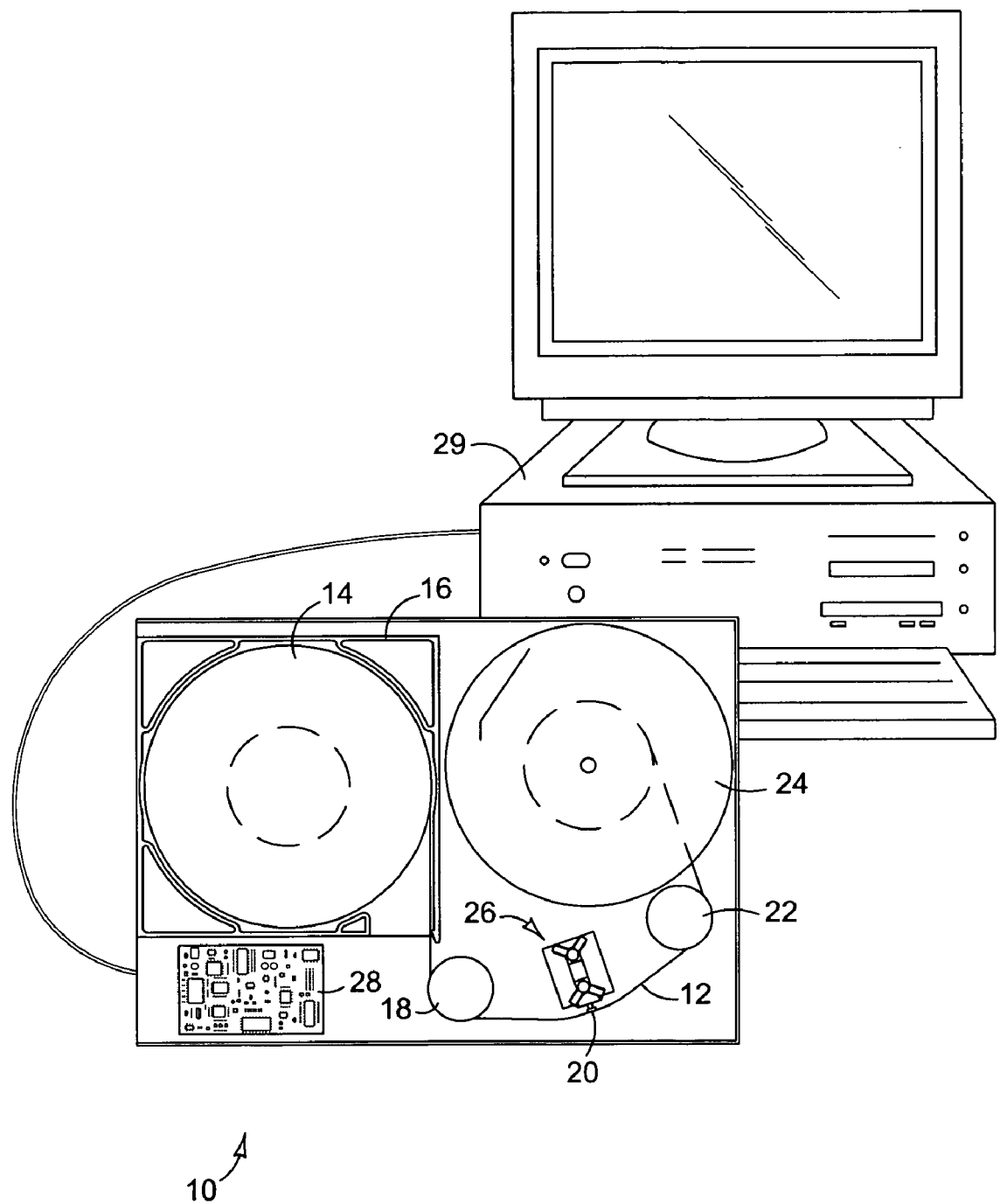

FIG. 1 shows a LTO drive 10. In FIG. 1, magnetic tape 12 is wound on supply reel 14 inside cartridge 16. When cartridge 16 is inserted into drive 10, tape 12 passes around guide 18, over head assembly 20, around guide 22, to take up reel 24. Head assembly 20 contains one or more read heads, write heads, or combined read/write heads. A "head" as used in this document means a transducer that either converts an electrical signal to the form required to write the signal to a medium (a write head), or reads a signal from a medium and converts it to an electrical signal (a read head). The read and write functions can be combined in a single read/write head. Tape drives typically use a magnetic head, where an electrical signal drives a time-varying magnetic field that magnetizes spots, or domains, on the surface of the magnetic tape. A CD-ROM drive typically uses an optical head, where an electrical signal drives a laser that varies the reflectivity of an optical medium.

Head assembly 20 is mounted to an actuator 26 which moves head assembly 20 across the width of tape 12. An electronic controller 28 receives read and write instructions and data from a computer or other host device 29. Controller 28, which may include more than one controller unit, includes the programming, processor and associated memory and electronic circuitry necessary to control actuator 26, head assembly 20 and the other operative components of tape drive 10. As actuator 26 carries head assembly 20 back and forth across the width of tape 12, controller 28 selectively activates the heads to write data to tape 12 or read data from tape 12 according to the instructions received from the host device.

Figure 2:
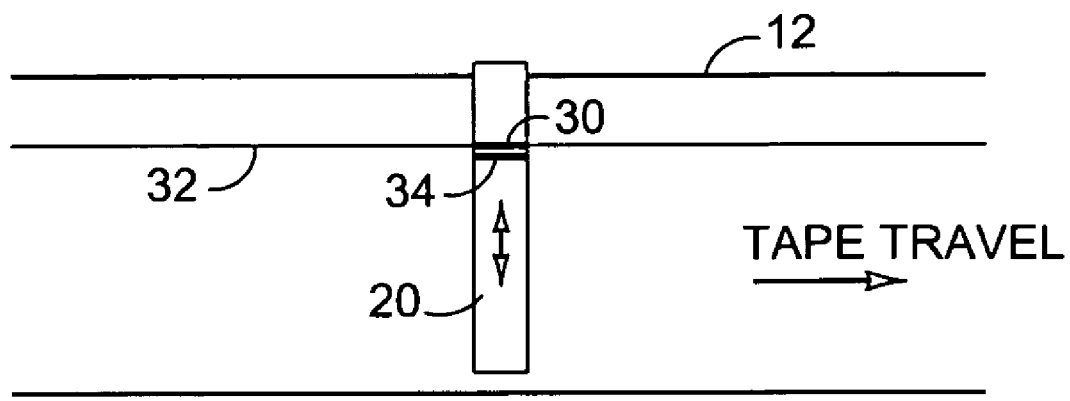

In an exemplary write operation shown in FIG. 2, magnetic tape 12 travels from supply reel 14 to take-up reel 24 (FIG. 1) past head assembly 20, where one or more write heads 30 write data onto the tape as one or more tracks 32. Write data may include storage information, or servo information to assist in positioning head assembly 20, or both storage and servo information. During a subsequent read operation shown in FIG. 3, data from track 32 is read by one or more read heads 34 as tape 12 travels past. Read head 34 must be aligned directly over track 32 to reliably read data. Positioning of head assembly 20 to place head 34 over track 32 occurs in two stages: coarse positioning, where read head 34 is brought close enough to track 32 to read servo information for track 32; and fine positioning, where the servo information is used to position read head 34 directly over track 32.

A LTO drive may be configured to perform read and write operations a variety of ways. For example, write head 30 and read head 34 may be combined into a single read/write head. Head assembly 20 may deploy an array of read/write heads to read or write an array of parallel tracks simultaneously.

Servo information may be read from a single track and used to position head assembly 20 to simultaneously read or write multiple tracks containing storage information. Tape drive 10 may read or write data as tape 12 moves from the supply reel 14 to take-up reel 24 or as tape 12 moves from take-up reel 24 to the supply reel 14 (FIG. 1).

FIGS. 4-7 illustrate the operation of an exemplary piezoelectric motor. A "piezoelectric motor" as used in this document means a device that imparts stepwise motion by flexing a piezoelectric beam against an object. If the motor is stationary, then the object moves. If the object is stationary, then the motor moves. A piezoelectric motor is able to impart motion greater than the beam flexes by making a series of steps in the same direction. Piezoelectric motors are capable of linear motion or rotary motion and may include more than one piezoelectric beam. Piezoelectric motors are capable of very small, repeatable steps and smooth operation. Step sizes may be as small as a few nanometers. Piezoelectric motors that may be adapted for use in embodiments of the present invention are commercially available from various manufacturers, such as Nanomotion, Ltd. in Yokneam, Israel.

Figure 8:
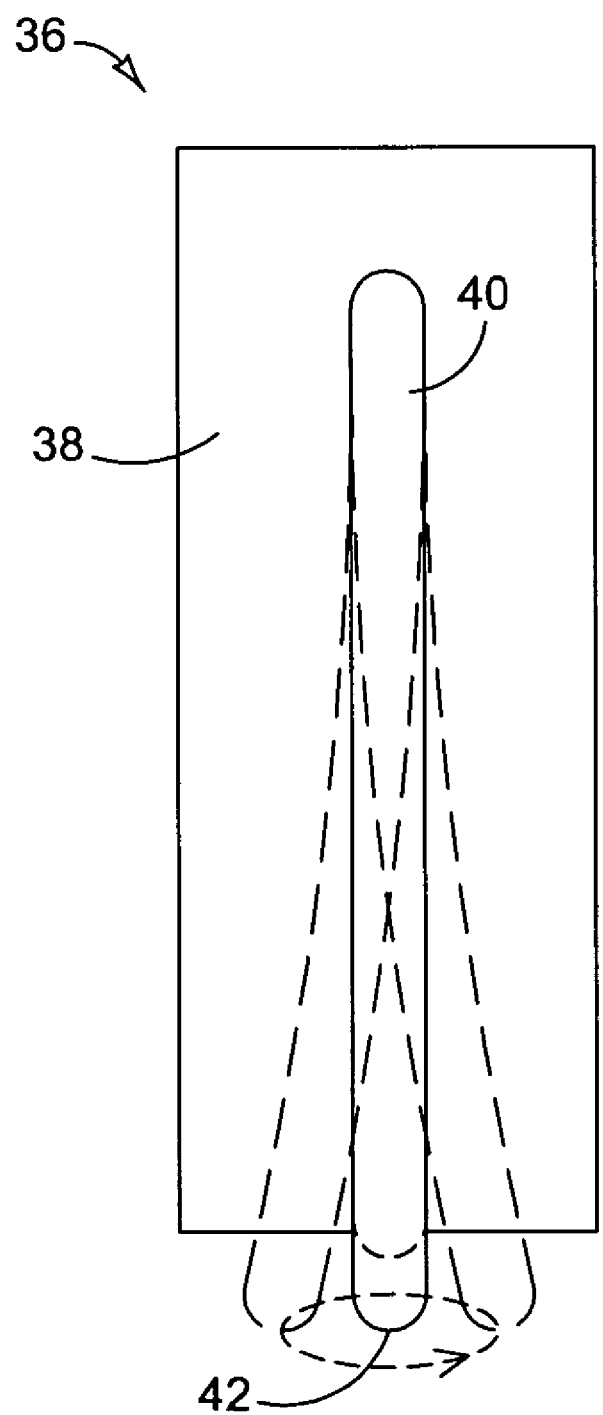
FIG. 8 illustrates the path traced by the end of a piezoelectric beam in a piezoelectric motor.

FIGS. 4-7 illustrate a simple piezoelectric motor 36 that includes a motor base 38 and a beam 40 of piezoelectric material attached to base 38. In operation, sinusoidal voltages of ultrasonic frequency applied to beam 40 excite both longitudinal and bending vibrations so that the free end 42 of beam 40 traces a planar, roughly elliptical path, as shown in FIG. 8. Each circuit taken by end 42 generates one step of motion. A spring 44 biases beam 40 against a stationary contact surface 46 so that the motor pushes against surface 46 as beam 40 oscillates. Contact surface 46 is preferably made of ceramic material or another suitably hard substance to prevent wear. The elliptical path traced by beam end 42 is in a plane perpendicular to contact surface 46. As beam 40 pushes against stationary surface 46, motor 36 moves relative to surface 44, as best seen by comparing the position of motor 36 in FIGS. 4-7.

Nanomotion's U.S. Pat. No. 5,877,579 describes the structure and operation of piezoelectric motors in more detail. The Description and Figures of U.S. Pat. No. 5,877,579 are incorporated herein by reference. With high excitation frequencies, piezoelectric motors can provide a smooth, constant driving force with the small, repeatable step size desirable for precise positioning. A piezoelectric motor may be configured to maintain its position without power upon removal of the excitation signal to eliminate the need for a holding signal, holding current, or external brake. For example, biasing spring 44 in FIGS. 4-7 holds beam 40 against surface 46 when motor 36 is not energized. Alternatively, the size and piezoelectric characteristics of beam 40 may be selected to preload beam 40 against surface 46 without an external biasing mechanism.

Figure 9:
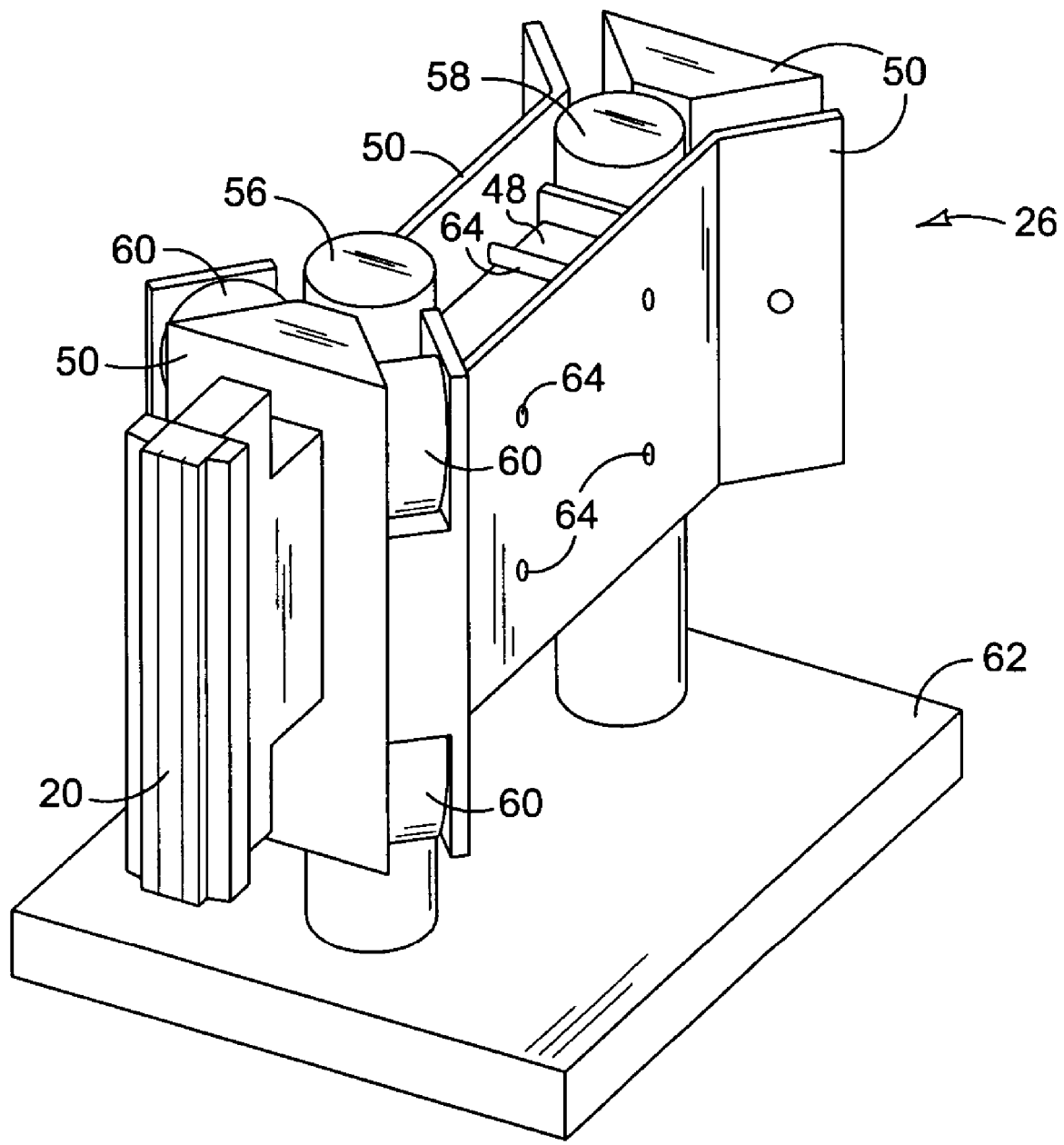
FIG. 9 is a perspective view the actuator of FIG. 1.
Figure 10:
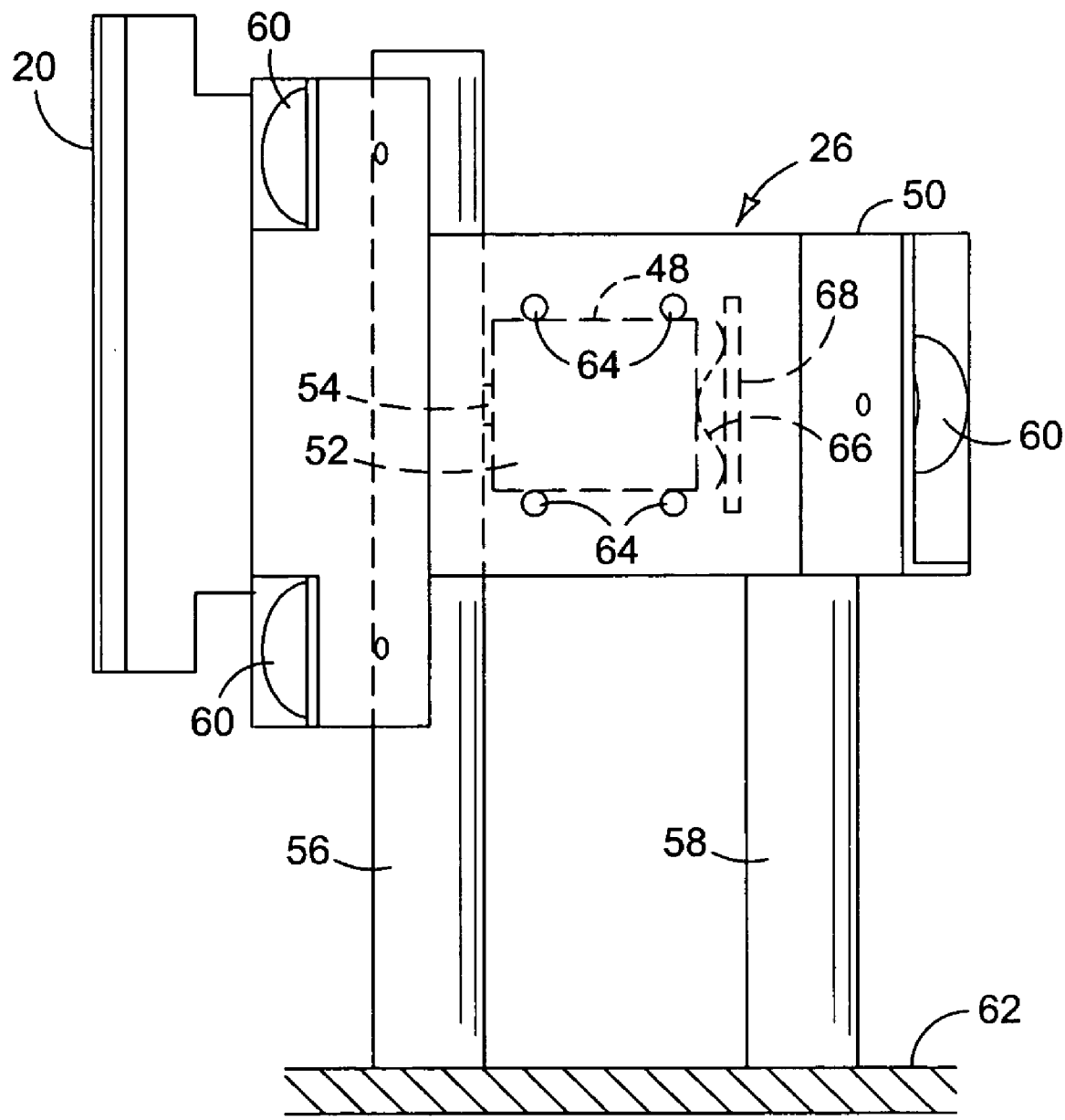
FIGS. 10 and 11 are elevation views of the actuator of FIG. 9 in different positions.
Figure 11:
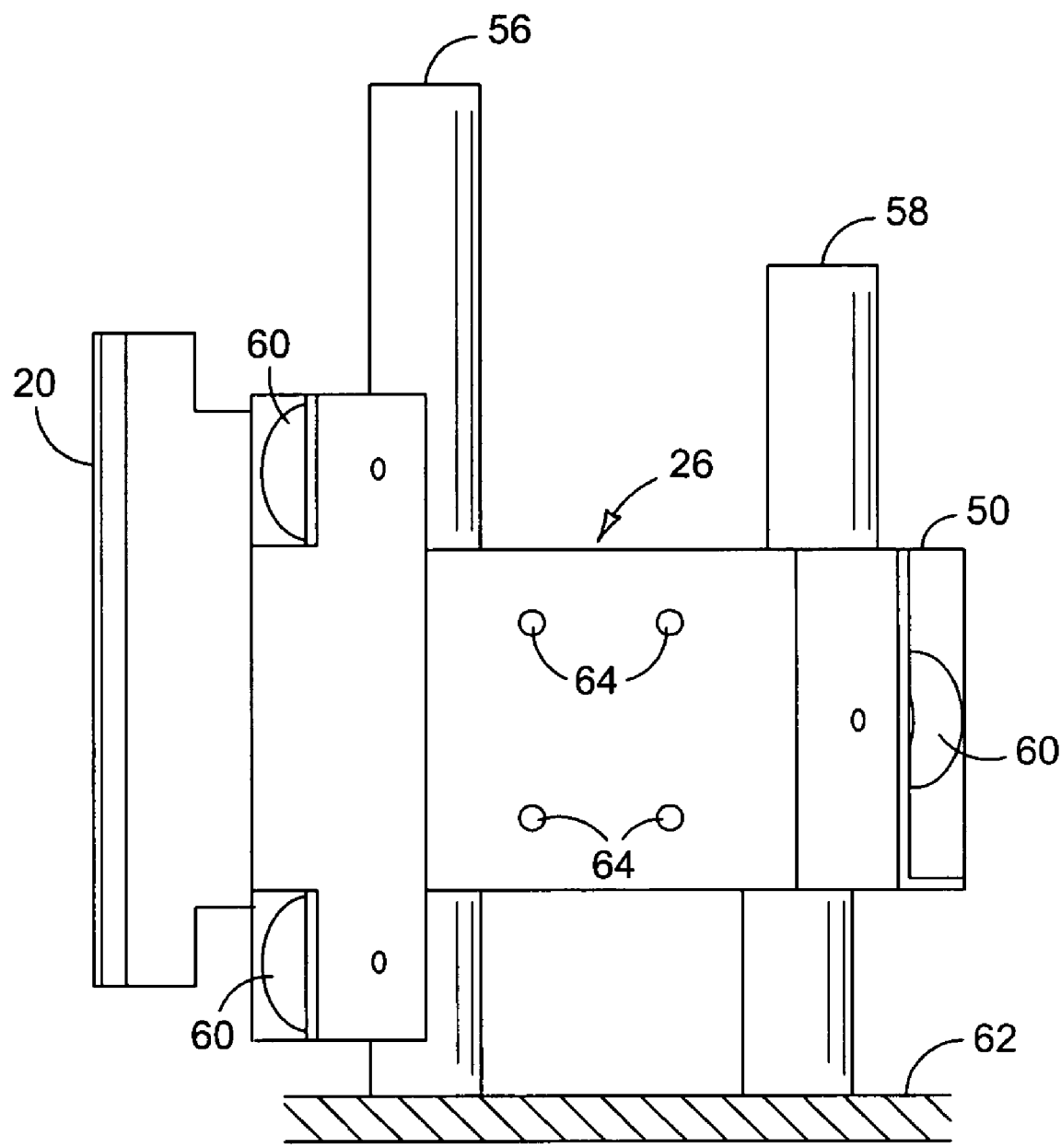
Figure 12:
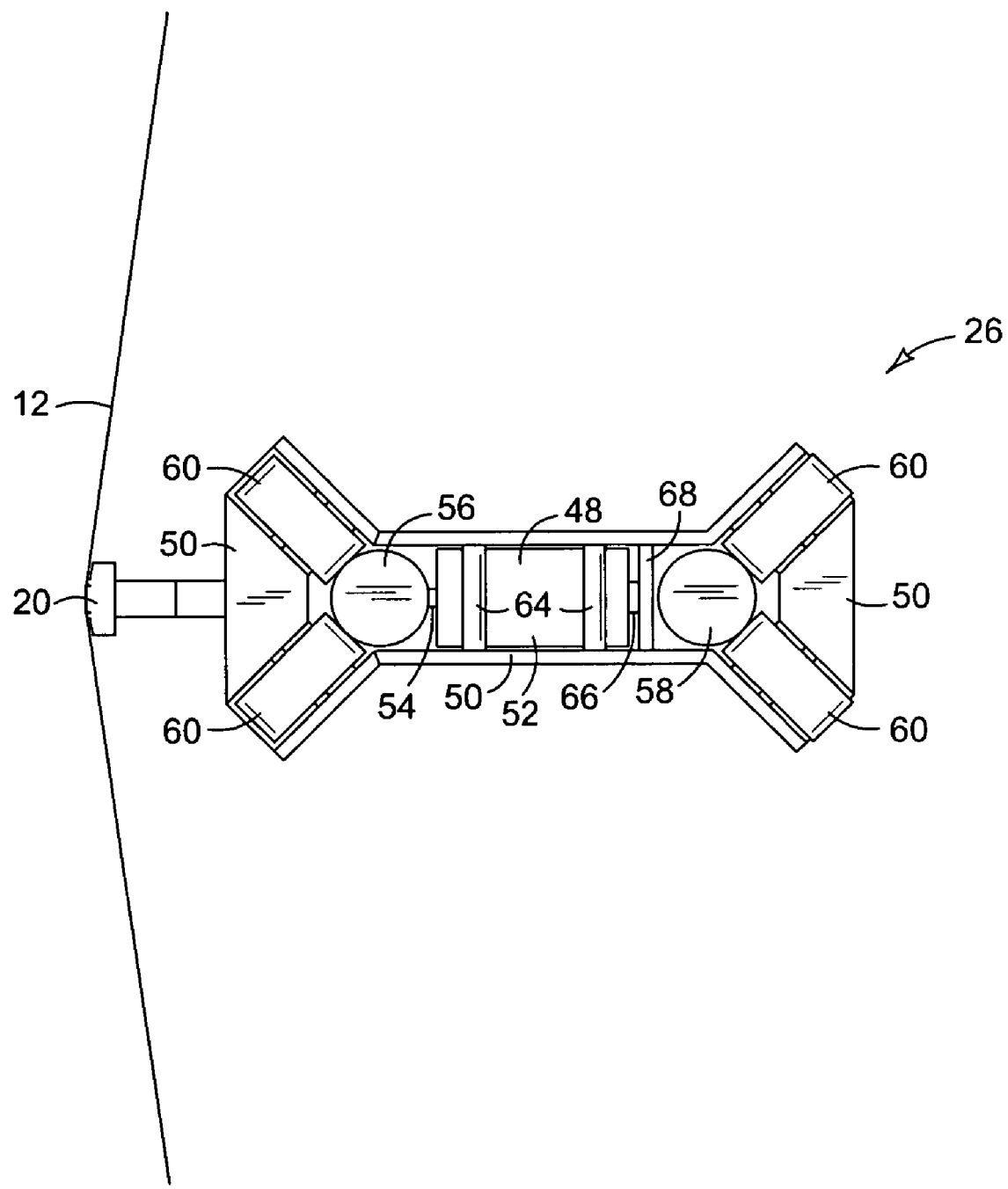
FIG. 12 is a plan view of the actuator of FIG. 9.

FIG. 9 is a perspective view of actuator 26. FIGS. 10 and 11 are elevation views of actuator 26 in different positions. FIG. 12 is a plan view of actuator 26. Referring to FIGS. 9-12, actuator 26 includes a piezoelectric motor 48 mounted to a carriage 50. Motor 48 includes a base 52 and a beam of piezoelectric material 54 attached to base 52. Beam 54 of motor 48 pushes against a front guide rail 56, which performs the function of stationary surface 46 in FIGS. 4-7. Carriage 50 rides along front guide rail 56 and rear guide rail 58 supported by bearings 60. Rails 56 and 58 are secured to an actuator base 62, which is secured to the chassis or other stable component of tape drive 10. Motor 48 is attached to carriage 50 through pins 64 or another suitable coupling to transmit motive force from motor 48 to carriage 50. A biasing spring 66 positioned between motor 48 and a spring base 68 on carriage 50 pushes motor 48 against front guide rail 56.

Figure 3:
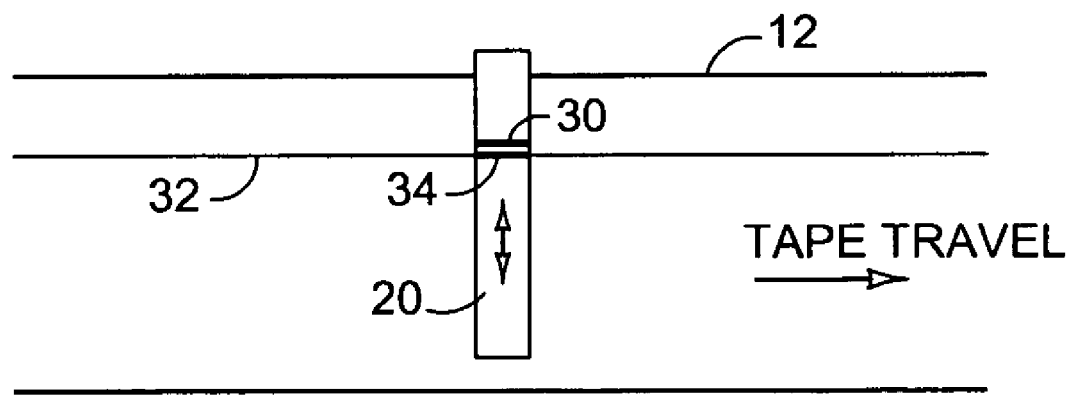

Referring to FIGS. 3 and 12, head assembly 20 is mounted to carriage 50 so that write heads 30 and read heads 34 are adjacent to magnetic tape 12. In operation, when piezoelectric motor 48 is energized, it moves up or down along stationary front guide rail 56 in the stepwise fashion described above for motor 36 in FIGS. 4-7. In this way, motor 48 carries carriage 50 up and down along guide rails 56 and 58 perpendicular to the direction of tape travel to properly position head assembly 20 for read and write operations. FIGS. 10 and 11 show carriage 50 in different positions along guide rails 56 and 58.

Figure 13:
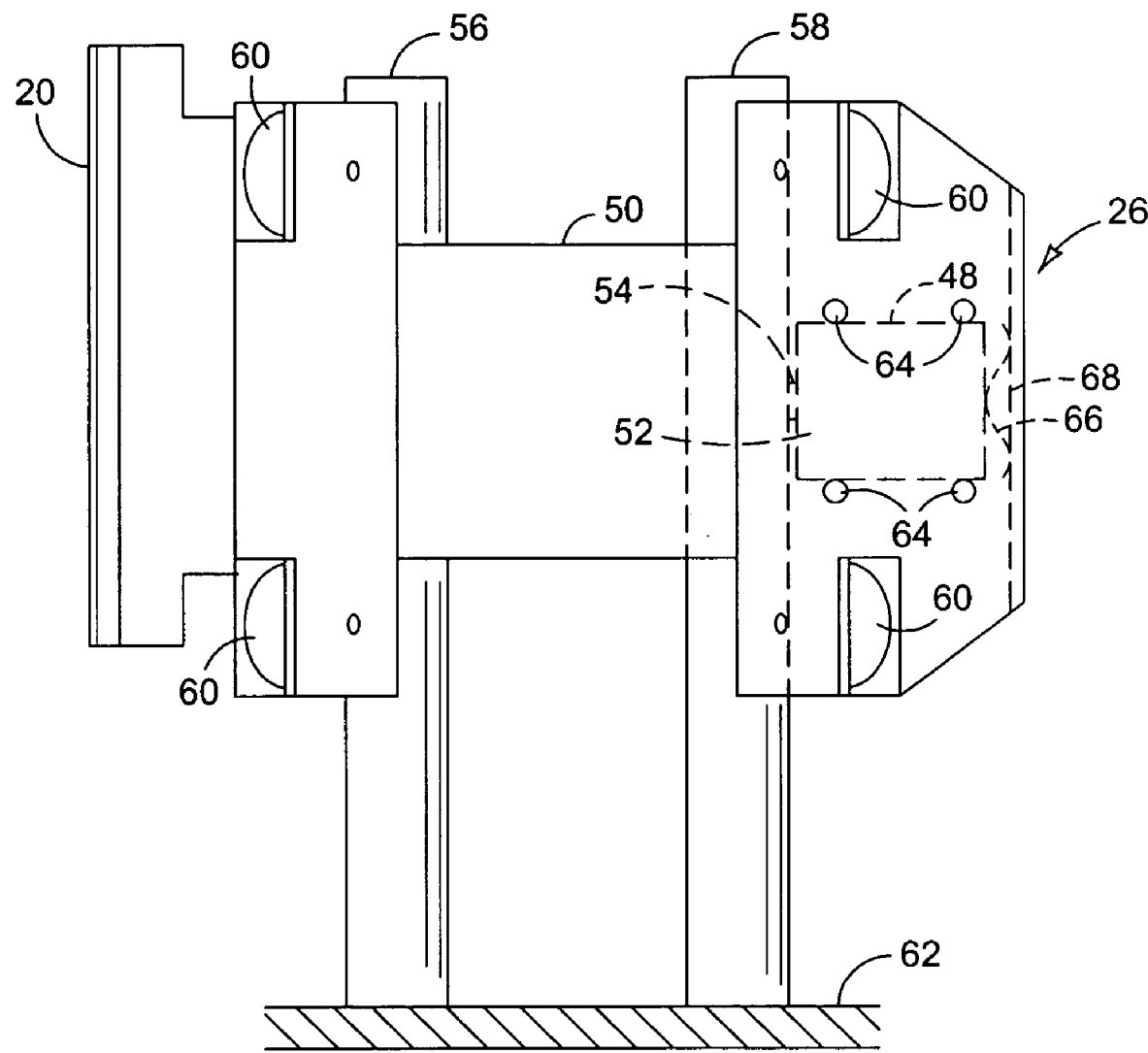
FIG. 13 is an elevation view of an actuator constructed according to another embodiment of the present invention.

FIG. 13 illustrates an actuator 26 in which the piezoelectric motor 48 is placed behind rear guide rail 58. In the embodiment of actuator 26 shown in FIG. 13, motor 48 pushes against rear guide rail 58, which performs the function of stationary surface 46 in FIGS. 4-7.

Figure 14:
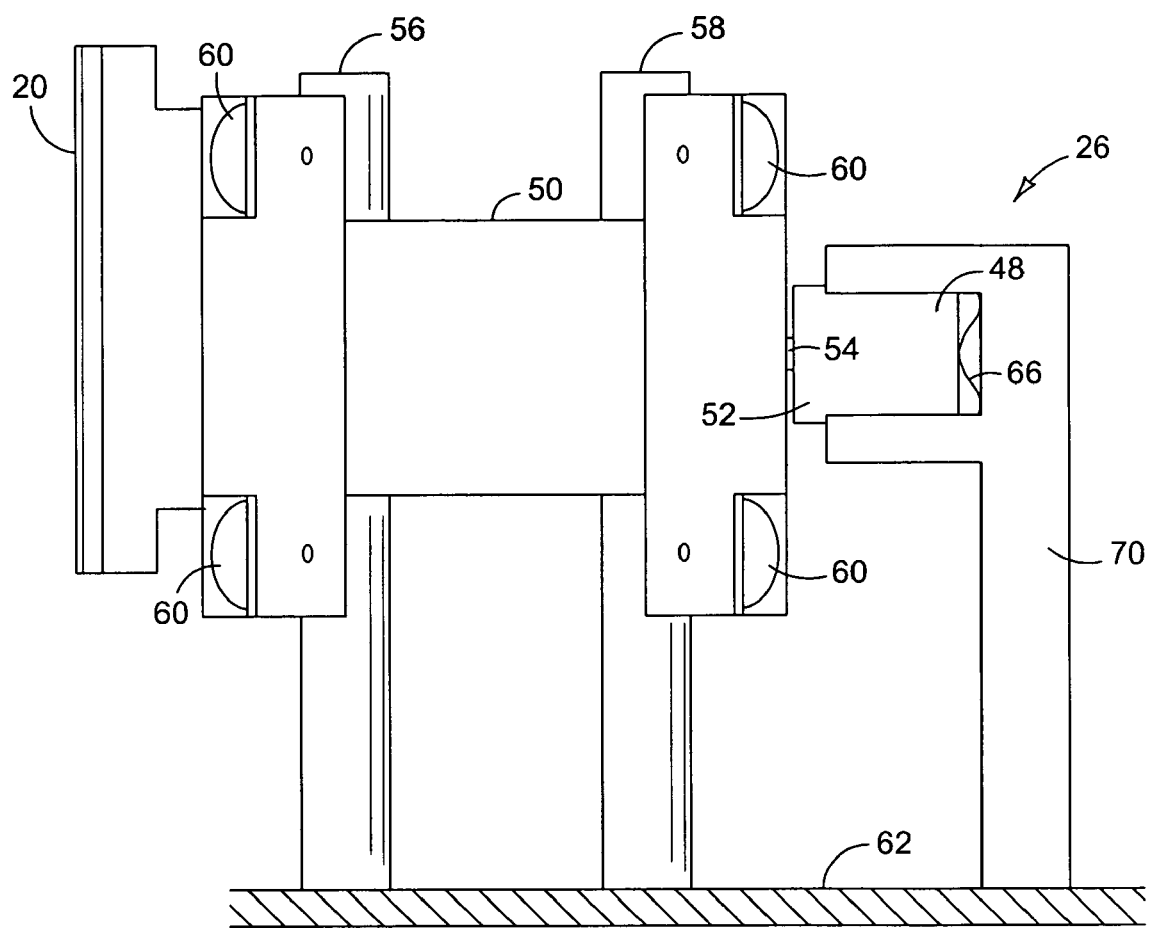
FIG. 14 is an elevation view of an actuator constructed according to another embodiment of the present invention.

FIG. 14 illustrates an actuator 26 in which piezoelectric motor 48 is not mounted to head carriage 50 and motor 48 remains stationary when energized. In the embodiment of actuator 26 shown in FIG. 14, motor 48 is mounted to a stationary post 70 secured to actuator base 62 adjacent to carriage 50. Biasing spring 66 pushes motor 48 against carriage 50. Post 70 may be located outside carriage 50, as shown in FIG. 14, or inside carriage 50, between guide rails 56 and 58 for example. In either case, when piezoelectric motor 48 is energized, it drives carriage 50 up or down along guide rails 56 and 58 in the stepwise fashion described above for motor 36 in FIGS. 4-7.

Figure 15:
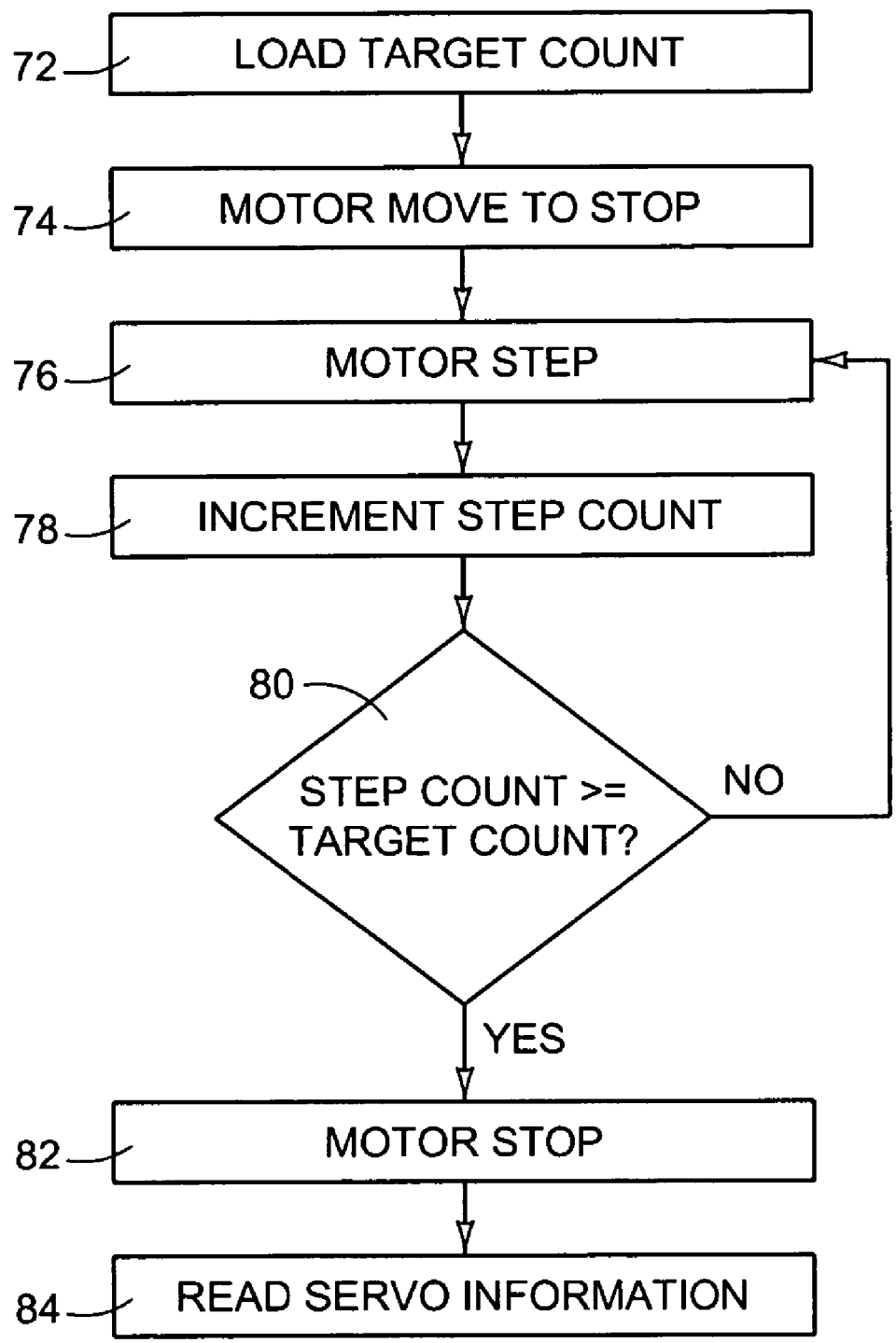
FIG. 15 is a flow diagram illustrating one exemplary method for coarse positioning a piezoelectric actuator.

FIG. 15 illustrates one exemplary method for coarse positioning a head assembly using a piezoelectric motor. Coarse positioning starts with step 72 where the target count is loaded with the number of steps (fixed units of distance) required to place a read or write head at the expected location of a desired track on the tape. The target count may be determined prior to operation by trial and error or by calculating the number of required steps based on the step size, the physical size of the tape, the number of tracks, and the track spacing. In step 74, the motor drives the actuator against the actuator base or another physical stop. In step 76, the motor moves one step away from the stop. In step 78, the step count is incremented by one step. In step 80, the new step count is compared to the target count. Steps 76, 78 and 80 are repeated until the step count equals the target count. In step 82, the motor is de-energized or otherwise signaled to lock the carriage in place. Since the stop provides a fixed reference location and the motor steps are repeatable, there is no need for a position sensor or closed loop servo control during coarse positioning. Once coarse positioning is completed, the head is in place to read servo information in step 84 to begin fine positioning. The steps shown in FIG. 15 may be implemented as a dedicated electronic circuit or as programming executed by a processor. The processor or circuit may be located on the tape drive controller.

"Bearing" as used in this document means any suitable object, structure or surface that movably supports the carriage for travel along the rails. Suitable bearings may include, for example, ball bearings, roller bearings, Gothic arch bearings, journal bearings, bushings and the like.

The exemplary embodiments shown in the figures and described above illustrate but do not limit the invention. Other forms, details, and embodiments may be implemented. For example, the piezoelectric actuator is not limited to use in magnetic tape drives. The magnetic tape may be replaced by a rotating magnetic medium as used in a hard disk drive. The magnetic medium may be replaced by an optical medium, an optical drive for example. Guide rails need not be round, but may have any suitable cross section. Only one guide rail (or none at all) may be necessary or desirable in some applications. Guide rails may be curved to follow the surface of a curved medium. Hence, the foregoing description should not be construed to limit the spirit and scope of the invention, which is defined in the following claims.

What is claimed is:

1. An actuator, comprising:
a stationary guide;
a piezoelectric motor pushing on the guide; and
a carriage at least partially surrounding the motor and movable back and forth along the guide at the urging of the motor to move a head assembly with respect to a tape.

2. A head carriage and actuator assembly, comprising:
a stationary guide;
a carriage movable along the guide;
a head carried by the carriage; and
a piezoelectric motor attached to the carriage opposite the head such that the guide lies between the head and the motor, the motor comprising a base attached to the carriage and a beam of piezoelectric material attached to the base, a free end of the beam pushing on the guide.

3. A head carriage and actuator assembly for a tape drive, comprising:
a first guide rail;
a second guide rail spaced apart from the first guide rail;
a carriage supported on and movable along the first and second guide rails;
a magnetic head carried by the carriage, the head positioned adjacent to the first guide rail opposite the second guide rail such that the first guide rail lies between the head and the second guide rail; and
a piezoelectric motor attached to the carriage and operatively coupled to the first guide rail such that the motor when energized moves with the carriage along the guide rails.

4. The actuator of claim 3, wherein the motor comprises a base and a beam of piezoelectric material attached to the base, the base of the motor attached to the carriage and a free end of the beam pushing on the first guide rail.

5. The actuator of claim 3, wherein the motor is attached to the carriage between the first guide rail and the second guide rail.

6. The actuator of claim 3, wherein the carriage surrounds the motor.

7. A head carriage and actuator assembly, comprising:
a stationary guide;
a carriage movable along the guide;
a head carried by the carriage; and
a stationary piezoelectric motor pushing on the carriage such that the motor when energized moves with the carriage along the guide.

8. A tape drive, comprising:
a take-up reel;
a stationary guide;
a carriage movable along the guide;
a head carried by the carriage;
a tape path extending past the head to the take-up reel;
a piezoelectric motor attached to the carriage and pushing on the guide such that the motor when energized moves with the carriage along the guide; and
an electronic controller configured to receive read and write instructions and data from a computer or other host device and to control operation of the take-up reel, the actuator and the head.

9. The tape drive of claim 8, wherein the controller is configured to position the head according to the following method:
stopping the carriage at a known position;
the motor moving the carriage a first step from the known position;
counting the step;
comparing the step count to a target step count;
if the step count is less than the target step count, the motor moving the carriage another step; and
repeating moving, counting and comparing until the step count is equal to the target step count.

* * * * *